US005999806A

United States Patent [19]
Kaplan et al.

[11] Patent Number: 5,999,806
[45] Date of Patent: Dec. 7, 1999

[54] WAVEFORM COLLECTION FOR USE IN WIRELESS TELEPHONE IDENTIFICATION

[75] Inventors: Dmitry Kaplan, Bellevue; David M. Stanhope, Tacoma, both of Wash.

[73] Assignee: Cellular Technical Services Company, Inc., Seattle, Wash.

[21] Appl. No.: 08/808,630

[22] Filed: Feb. 28, 1997

[51] Int. Cl.⁶ .................................................. H04Q 7/32
[52] U.S. Cl. .......................................... 455/411; 455/410
[58] Field of Search .................................. 455/410, 411, 455/412, 414, 428, 434, 435, 445, 32.1, 67.1, 405, 423; 380/23, 25; 340/825.44, 825.15; 379/189

[56] References Cited

U.S. PATENT DOCUMENTS

| | | | |
|---|---|---|---|
| 4,800,387 | 1/1989 | Joy | 342/165 |
| 4,843,562 | 6/1989 | Kenyon et al. | 364/487 |
| 4,955,049 | 9/1990 | Ghisler | 379/58 |
| 5,005,210 | 4/1991 | Ferrell | 455/115 |
| 5,091,942 | 2/1992 | Dent | 380/46 |
| 5,222,140 | 6/1993 | Beller et al. | 380/30 |
| 5,237,612 | 8/1993 | Raith | 380/23 |
| 5,239,294 | 8/1993 | Flanders et al. | 340/825.34 |
| 5,241,598 | 8/1993 | Raith | 380/21 |
| 5,282,250 | 1/1994 | Dent et al. | 380/23 |
| 5,299,263 | 3/1994 | Beller et al. | 380/30 |
| 5,303,285 | 4/1994 | Kerihuel et al. | 379/58 |
| 5,309,501 | 5/1994 | Kozik et al. | 379/58 |
| 5,315,636 | 5/1994 | Patel | 379/58 |
| 5,319,699 | 6/1994 | Kerihuel et al. | 379/58 |
| 5,329,591 | 7/1994 | Magrill | 380/25 |
| 5,335,265 | 8/1994 | Cooper et al. | 379/59 |

(List continued on next page.)

Primary Examiner—Dwayne D. Bost
Assistant Examiner—Jean A. Gelin
Attorney, Agent, or Firm—Seed and Berry LLP

[57] ABSTRACT

A system and method for collecting reference waveforms from authorized wireless telephones in a wireless telephone network. The collected reference waveforms are used by a fingerprint analyzer to distinguish telephone calls made by the authorized wireless telephone from telephone calls made by an unauthorized wireless telephone. The system maintains a pool of specially designated unassigned telephone numbers and selects one telephone number from the pool at random which is provided to a valid subscriber of an authorized wireless telephone. The randomly selected telephone number is to be called by the valid subscriber using the authorized cellular telephone for the purpose of collecting reference waveforms by the system. A radio frequency (RF) receiver of the system monitors and receives transmission signals from a plurality of wireless telephones. Each transmission signal contains a destination telephone number and an identification of its wireless telephone such as MIN/ESN identifiers. The system selects for purposes of collecting reference waveforms the transmission signal whose destination and wireless telephone identification respectively correspond to the randomly selected destination and the identification of the authorized wireless telephone. This ensures that that particular transmission signal belongs to the authorized wireless telephone of the valid subscriber rather than an unauthorized wireless telephone belonging to a pirate since the pirate has no way of knowing the randomly selected telephone number provided to the valid subscriber. The processor then extracts the reference waveform that represents a transmission characteristic of the authorized wireless telephone and stores the extracted reference waveform in memory for use by the fingerprint analyzer.

48 Claims, 6 Drawing Sheets

U.S. PATENT DOCUMENTS

| | | | |
|---|---|---|---|
| 5,335,278 | 8/1994 | Matchett et al. | 380/23 |
| 5,345,595 | 9/1994 | Johnson et al. | 455/33.1 |
| 5,375,244 | 12/1994 | McNair | 395/725 |
| 5,390,245 | 2/1995 | Dent et al. | 380/23 |
| 5,392,355 | 2/1995 | Khurana et al. | 380/23 |
| 5,392,356 | 2/1995 | Konno et al. | 380/23 |
| 5,420,908 | 5/1995 | Hodges et al. | 379/58 |
| 5,420,910 | 5/1995 | Rudokas et al. | 379/59 |
| 5,448,760 | 9/1995 | Frederick | 455/56.1 |
| 5,455,863 | 10/1995 | Brown et al. | 380/23 |
| 5,465,387 | 11/1995 | Mukherjee | 455/26.1 |
| 5,467,382 | 11/1995 | Schorman | 379/58 |
| 5,488,649 | 1/1996 | Schellinger | 379/62 |
| 5,509,075 | 4/1996 | Grube et al. | 380/23 |
| 5,517,554 | 5/1996 | Mitchell et al. | 379/59 |
| 5,517,555 | 5/1996 | Amadon et al. | 379/59 |
| 5,517,568 | 5/1996 | Grube et al. | 380/23 |
| 5,535,431 | 7/1996 | Grube et al. | 455/54.1 |
| 5,537,474 | 7/1996 | Brown et al. | 380/23 |
| 5,541,977 | 7/1996 | Hodges et al. | 379/58 |
| 5,548,636 | 8/1996 | Bannister et al. | 455/567 |
| 5,551,073 | 8/1996 | Sammarco | 455/89 |
| 5,555,192 | 9/1996 | Grube et al. | 364/514 R |
| 5,555,551 | 9/1996 | Rudokas et al. | 379/59 |
| 5,557,654 | 9/1996 | Mäenpää | 379/58 |
| 5,615,408 | 3/1997 | Johnson et al. | 455/33.1 |
| 5,625,869 | 4/1997 | Ngamatsu et al. | 455/33.1 |
| 5,633,914 | 5/1997 | Rosa | 379/59 |
| 5,655,004 | 8/1997 | Holbrook | 455/411 |
| 5,713,072 | 1/1998 | Marth et al. | 455/33.1 |
| 5,715,518 | 2/1998 | Barrere et al. | 455/411 |
| 5,748,722 | 5/1998 | Lee | 340/825.04 |
| 5,748,742 | 5/1998 | Tisdale et al. | 380/49 |
| 5,758,277 | 5/1998 | Hawkes | 455/410 |
| 5,770,846 | 2/1996 | Mos et al. | 380/25 |
| 5,777,558 | 7/1998 | Pennypacker et al. | 340/635 |
| 5,790,645 | 8/1998 | Fawcett et al. | 379/189 |
| 5,805,674 | 9/1998 | Anderson, Jr. | 379/93.03 |

WAVEFORM COLLECTION FOR USE IN WIRELESS TELEPHONE IDENTIFICATION

TECHNICAL FIELD

The present invention relates to wireless telephone systems, and in particular, to a system and method for collecting radio frequency waveforms of a wireless telephone for use in distinguishing an authorized wireless telephone from an unauthorized wireless telephone.

BACKGROUND OF THE INVENTION

In a communications network, it is often desirable to identify and distinguish one transmitter from other transmitters operating within the network. For example, in the radio telephone industry, a cellular telephone system utilizes an electronic serial number (ESN) and a mobile telephone identification number (MIN) to provide a unique identification for each cellular telephone. To place a telephone call, the individual subscriber or other authorized user of a cellular telephone dials a telephone number and presses the "Send" button. In response, the cellular telephone transmits its ESN and MIN to the cellular system so the individual subscriber can be charged for the telephone call.

Unfortunately, unscrupulous individuals illegally operate cellular telephones by "cloning" the ESN and MIN of a valid subscriber's telephone in order to obtain illegal access to the cellular system without paying for the service. A pirate can obtain the ESN and MIN of a cellular telephone by monitoring a transmission of the cellular telephone, and then programming them into another telephone for illegal use. Thus, the mere transmission of the authentic ESN and MIN is inadequate to protect a cellular telephone system from illegal use by pirates.

In an effort to provide additional security, some cellular systems authenticate cellular telephones based on the transmission of data by the cellular telephone during a call set-up process. Rather than identify the cellular telephone by its ESN and MIN alone, the system identifies a cellular telephone by its transmission characteristics. In this manner, the cellular system can reject calls from cloned cellular telephones even when those cellular telephones transmit valid ESN and MIN numbers. For example, in U.S. Pat. No. 5,005,210 issued to Ferrell on Apr. 2, 1991 ("the Ferrell patent"), incorporated herein by reference, a system is described that analyzes certain transmitter characteristics in an effort to identify the transmitter type. The system in the Ferrell patent analyzes the manner in which the modulator makes a transition to the designated carrier frequency. This transient reference waveform is used to identify the type of transmitter. The transmission characteristics of the reference waveform can be processed in different manners to create a "fingerprint" of the individual transmitter.

While the Ferrell patent describes one class of transmission characteristics that can be used as a fingerprint, other fingerprint characteristics are also known in the art. For example, U.S. Pat. No. 5,420,910, issued to Rudokas on May 30, 1995 ("the Rudokas patent"), incorporated herein by reference, describes an identifier, such as a radio frequency signature, that can be used to positively identify a valid cellular telephone or a known fraudulent telephone. Other types of signature or fingerprint authentication systems are also known in the art.

Fingerprint authentication systems all require at least one transmission characteristic waveform, known to be generated by the authentic cellular telephone, to be used as a reference waveform for the fingerprint authentication system. Some systems may rely on more than one reference waveforms to generate the fingerprint. The term fingerprint as used herein is intended to include reference waveforms transmitted by a transmitter as well as the various transmission characteristics derived from those reference waveforms.

An effective fingerprint identification technique depends largely on the existence and quality of a database of stored fingerprints. In the Ferrell patent, a database of valid reference waveforms are collected by waiting for the transmitters to turn on. Not surprisingly, this type of a passive collection process may take a very long time to develop due to the unpredictability of the turn-on behavior of the transmitters. Moreover, such a passive collection process is impractical in a communications network such as a cellular telephone system in which there are millions of cellular telephones whose reference waveforms need to be collected.

Moreover, even when a database of high quality fingerprints exists, there are times when the stored fingerprint of a particular authorized cellular telephone may not reflect the true transmission characteristics of that cellular telephone. One reason is that the transmission characteristics of the authorized cellular telephone may have changed over time due to the aging or peculiar nature of the transmitter circuits in the authorized cellular telephone. Another reason is that a sophisticated pirate may have discovered how the fingerprint authentication system collects the reference waveforms and corrupted the stored fingerprint with a fingerprint of the unauthorized cellular telephone. As can be appreciated, this causes a serious problem for both the valid subscriber using the authorized telephone and the cellular service provider.

If the fingerprint authentication system misidentifies a valid call from the authorized telephone as fraudulent and blocks the call, the result is serious inconvenience to the valid subscriber and loss of revenue for the cellular service provider. On the other hand, if the fingerprint authentication system identifies a call from the pirate's unauthorized cellular telephone as authorized and allows the calls, it results in loss of revenue for the cellular service provider. Both situations are to be avoided if possible.

Therefore, it can be appreciated that there is a significant need for a system and method for rapidly collecting reference waveforms from an authorized cellular telephone to establish or reestablish a valid fingerprint. There is also a significant need to ensure that the reference waveforms being collected are transmitted from the authorized cellular telephone rather than from a pirate's unauthorized cellular telephone. The present invention provides these and other advantages as will be illustrated by the following description and accompanying figures.

SUMMARY OF THE INVENTION

The present invention is embodied in a system and method for collecting a reference waveform from an authorized wireless telephone in a wireless telephone network. The collected reference waveforms are used by a fingerprint analyzer to distinguish telephone calls made by the authorized wireless telephone from telephone calls made by an unauthorized wireless telephone.

In one aspect, the system includes a processor that maintains a pool of unassigned telephone numbers and selects one telephone number from the pool at random. The randomly selected telephone number is provided to a valid subscriber of an authorized wireless telephone. The randomly selected telephone number is to be called by the valid subscriber using the authorized wireless telephone for the purpose of collecting reference waveforms. A radio frequency (RF) receiver of the system monitors and receives call request transmission signals from a plurality of wireless telephones. Each call request transmission signal contains a destination such as a telephone number and an identification of its wireless telephone such as MIN/ESN. The processor looks for the call request transmission signal whose destination and the wireless telephone identification respectively correspond to the randomly selected telephone number and the identification of the authorized wireless telephone. This insures that that particular call request transmission signal belongs to the authorized wireless telephone of the valid subscriber rather than an unauthorized wireless telephone belonging to a pirate since the pirate has no way of knowing the randomly selected telephone number provided to the valid subscriber. The processor then extracts the reference waveform that represents a transmission characteristic of the authorized wireless telephone and stores the extracted reference waveform in memory for use by the fingerprint analyzer.

In another aspect of the invention, the system collects 10 to 40 reference waveforms to insure that there are sufficiently large number of samples from which to derive a fingerprint. In one embodiment, the valid subscriber is asked to use the authorized wireless telephone to call the selected destination repeatedly for the purpose of the system collecting reference waveforms. Preferably, each time a reference waveform is collected, the processor connects the call to an announcement module that asks the valid subscriber to call again if more reference waveforms are needed. Otherwise, the announcement module tells the valid subscriber that the reference waveform collection process is complete and no more calls are necessary.

In another embodiment, the system automatically collects all the reference waveforms required once it verifies that the call request transmission signal is transmitted by the authorized wireless telephone. This way, the valid subscriber needs to call the destination number only once regardless of the number of reference waveforms that are to be collected. In this embodiment, the system sends a polling message such as a page or registration request. The authorized wireless telephone receives the polling message and in response, transmits an RF signal containing the reference waveform. The system extracts the reference waveform from the RF signal and stores it in memory. The extracted reference waveform is then stored. The system repeatedly polls the authorized wireless telephone in order to receive a sufficiently large number of reference waveforms to be able to generate an accurate fingerprint during that one call.

DETAILED DESCRIPTION OF THE INVENTION

For a more complete understanding of the present invention, the operation of a wireless cellular telephone system will be briefly discussed. Although the discussion that follows is directed to cellular telephones, it should be clearly understood that the invention can be used with any wireless telephone devices that may transmit voice such as cellular telephones or data such as data modems. Persons of ordinary skill in the art will also appreciate that the techniques described herein may be used in any type of wireless communications systems including personal communications services (PCS) systems. The term telephone as used herein is intended to include devices for wireless voice and data communication.

Figure 1:
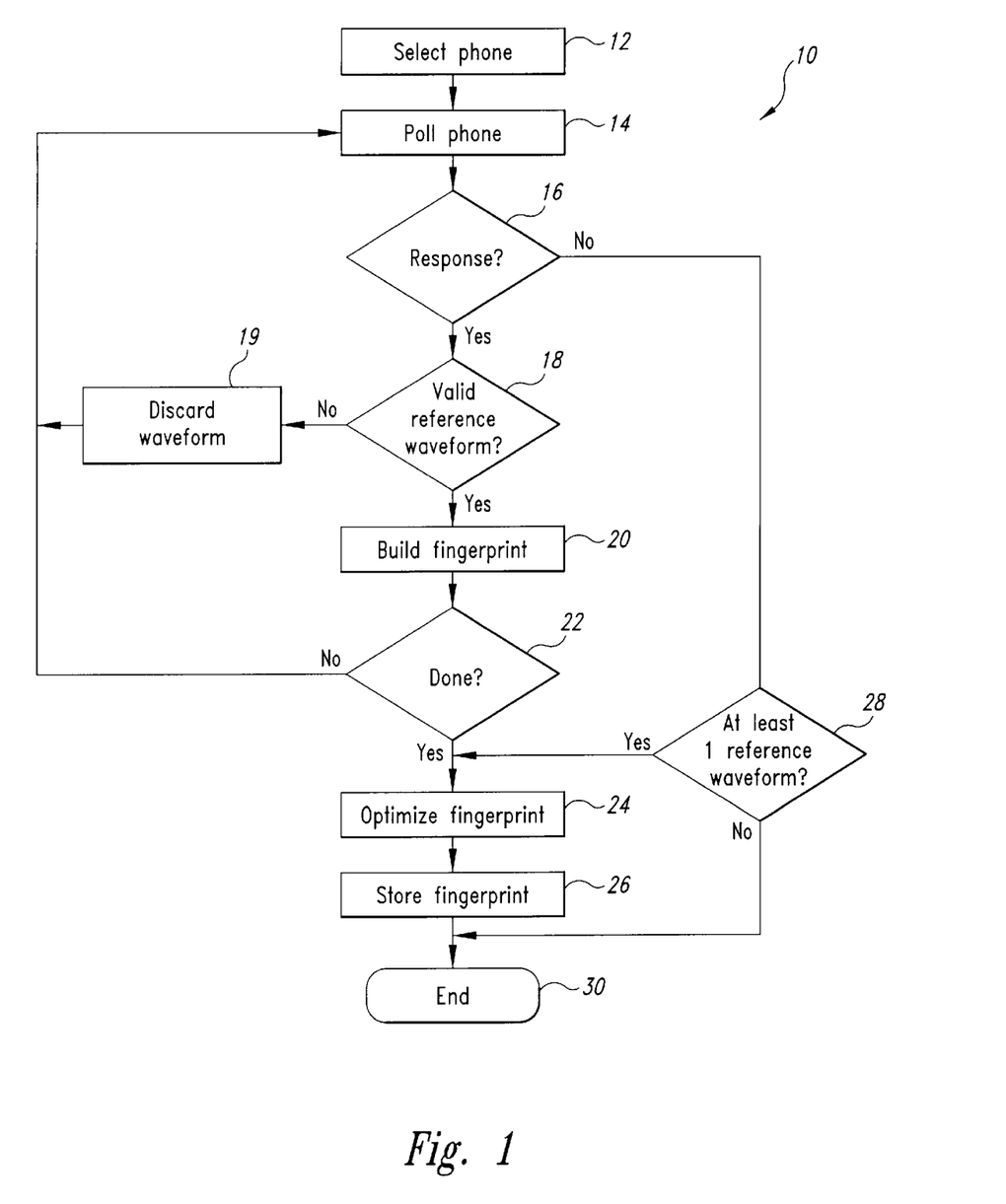
FIG. 1 is a flowchart for a method of collecting transmitter reference waveforms according to the present invention.

FIG. 1 is a flowchart of a reference waveform collection routine 10 for collecting reference waveforms that are used in building a fingerprint of a cellular telephone. The "cellular telephone" as used herein includes any mobile telephone used in single site or multiple cell site telephone systems. In step 12, the routine 10 identifies and selects a cellular telephone whose fingerprint needs to be established. In one embodiment, the routine 10 monitors active calls from a selected group of cell sites and generates a list of cellular telephones by their ESN and MIN. The cellular telephones in the list are currently transmitting during a call and are being used by users. From the list, one cellular telephone is selected. Step 12 also verifies that the selected cellular telephone is being used by an authorized user (subscriber). There are many methods of verification. One method is to obtain the dialed digits of the party to which the cellular telephone is connected and compare the digits against a database of frequently called numbers of the selected cellular telephone. If there is a match, the routine 10 assumes that the cellular telephone in use belongs to an authorized user rather than a pirate. Other methods of verification include comparing the dialed digits against a database of known telephone numbers previously called by cloned phones. If there is a match, then the routine 10 assumes a pirate is operating the cloned telephone and the verification fails. Once the cellular telephone passes the verification process, the routine 10 waits until the telephone hangs up.

Upon hang-up, the routine 10 is ready to start collecting reference waveforms from the transmitter of the selected cellular telephone. At step 14, a polling message is sent to the cellular telephone. Polling as used herein includes any transmission event capable of eliciting a suitable transmission response from the selected cellular telephone. Preferably, a page, registration, audit or maintenance message is used as the polling message so that the process of polling occurs in the background for the sole purpose of collecting reference waveforms from the selected cellular telephone. In this way, the process is totally transparent to the user and multiple reference waveforms may be collected from time to time without ever bothering the user of the cellular telephone.

In response to the poll, the selected cellular telephone turns on its transmitter and transmits an RF signal containing a response message and a reference waveform. In one embodiment, the reference waveform may be the turn-on transient, represented by the leading portion of the RF signal, the turn-off transient, represented by the trailing portion of the RF signal, of the cellular telephone's transmitter or some other portion of the RF signal. Such reference waveforms are described in greater detail in the Ferrell patent. At decision 16, the routine 10 checks for a response from the selected cellular telephone. If there is no response within a predetermined time period, control passes to step 28. If there is a response, however, the reference waveform contained in the RF signal is obtained and stored, and control passes to decision 18. While the stored reference waveform may be an actual RF waveform, it is preferably a baseband demodulated waveform.

At decision 18, a check is made to ensure that the received reference waveform is valid. For example, in decision 18 a check is made for the receipt of multiple reference waveforms and whether the reference waveform was received from a cell site other than the group of selected cell sites. Either condition may signify that a cloned cellular telephone may be operating at the same time as the selected cellular telephone. In decision 18, a check is also made of the quality of the received reference waveform. As can be appreciated, the quality of the reference waveform is affected by many factors such as the location of the cellular telephone, strength of the battery in the cellular telephone, multipath interference, or other sources of radio frequency interference. Thus, if the received reference waveform grossly deviates from an expected reference waveform, step 19 is executed and the received reference waveform is discarded. Subsequently, control passes to step 14 where the cellular telephone is polled again. However, if the received reference waveform is determined to be valid, step 20 is executed.

In the routine 10, steps 14–20 are repeated until a sufficient number of valid reference waveforms are collected. As the reference waveforms are collected, step 20 builds a fingerprint of the selected cellular telephone. In one embodiment, certain transmission characteristics including turn-on transmitting amplitude, phase modulation versus time, and deviation from a center frequency may be derived from the received reference waveforms. The process of obtaining such a fingerprint is described in more detail in the Ferrell patent. Alternatively, a fingerprint may comprise a composite mean waveform derived from the received reference waveforms, and standard deviation and variance of the received reference waveforms. The process of obtaining such a fingerprint is described in more detail in a related application, entitled "ADAPTIVE WAVEFORM MATCHING FOR USE IN TRANSMITTER IDENTIFICATION," Ser. No. 08/611,429, filed on Mar. 6, 1996, and having a common assignee, which is incorporated herein by reference. In step 20, normalization and alignment of the waveforms with respect to each other may also be performed as part of building the fingerprint.

In decision 22, it is determined whether a sufficient number of valid reference waveforms have been collected. In one embodiment, at least 10 reference waveforms and preferably 20–40 reference waveforms are considered sufficient. Alternatively, the number of received reference waveforms may be considered sufficient when the variance of the received reference waveforms is below a predetermined threshold level.

If in decision 16 there is determined to be no response from the selected cellular telephone, in decision 28 it is determined whether at least one valid reference waveform has been received. While it is preferable to collect at least 10 waveforms, the present invention may work with only one reference waveform. If no reference waveform has been received at all, control passes to step 30 where the routine 10 ends. If there has been at least one response, however, control passes to step 24.

In step 24, the fingerprint built from step 20 is optimized. This step may be performed in real-time or at a later time when fingerprints for a group of cellular telephones may be processed. In step 24, a more rigorous analysis and processing of the received reference waveforms are performed in order to obtain an optimized fingerprint. The optimization step may include rejection of some of the received reference waveforms based on statistical analysis, and improved normalization and alignment of the waveforms.

In step 26, the optimized fingerprint is stored in a database. Preferably, digital data representing the received reference waveforms are also stored in the database for future use including further optimization of the fingerprint and obtaining a different type of fingerprint. As will be appreciated by persons of ordinary skill in the art, the waveform collection routine 10 may also be used to update the fingerprint database in order to obtain a new or revised fingerprint to accommodate changes that may occur over time in the transmitter of the cellular telephone. Once the optimized fingerprint is stored, the routine 10 ends at step 30.

Persons of ordinary skill in the art will appreciate that the reference waveform collection routine 10 described above provides the advantage of rapidly collecting reference waveforms from a large number of transmitters by actively polling the cellular telephones without waiting for the cellular telephones to turn on as was previously necessary. Moreover, the reference waveform collection routine occurs in the background and the users of the cellular telephones are totally unaware of the collection process. Preferably, the waveform collection system uses an already existing cellular telephone system to provide a convenient and cost-effective method of collecting reference waveforms.

Figure 2:
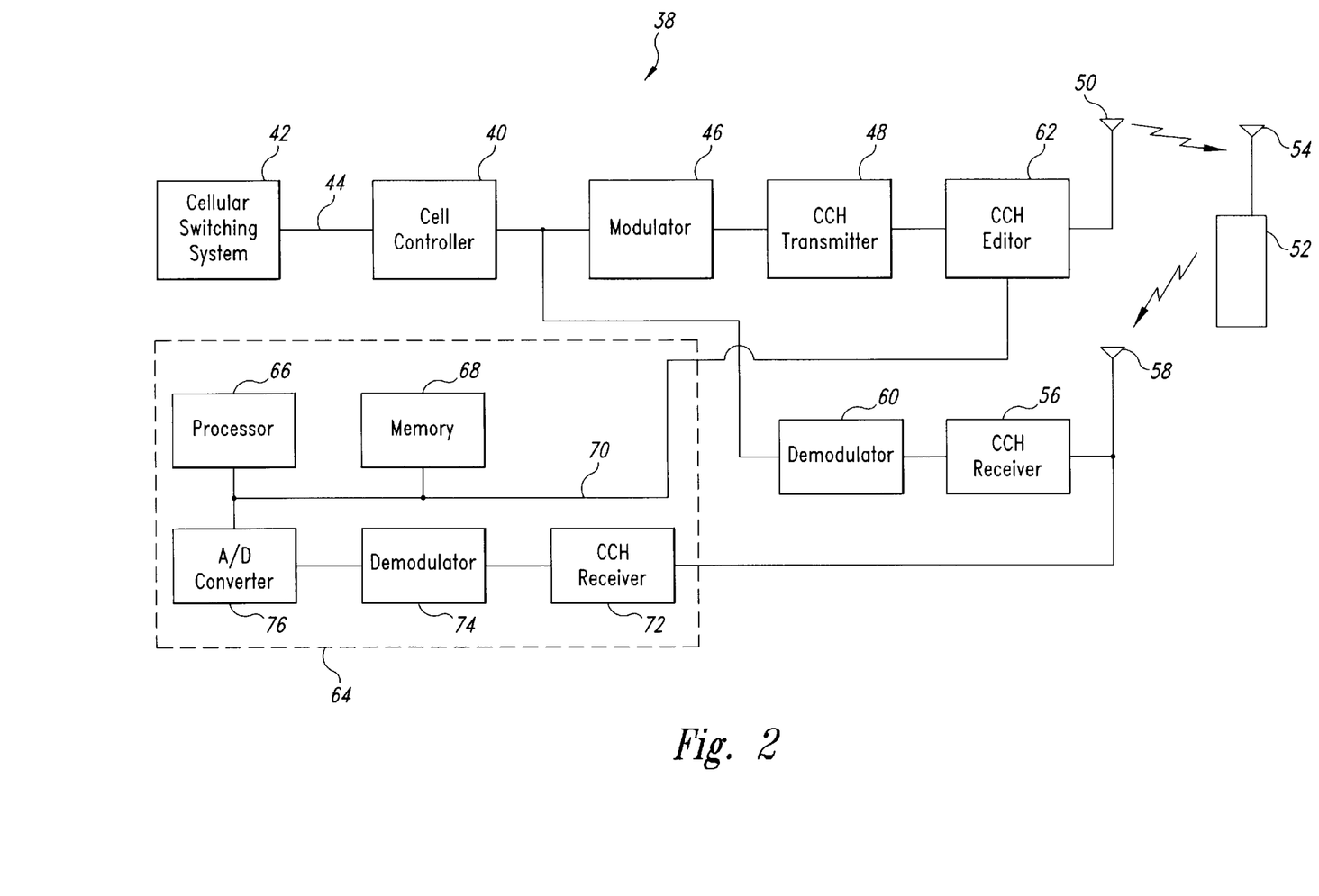
FIG. 2 is a functional block diagram of a transmitter reference waveform collection system according to the present invention.

A functional block diagram of a reference waveform collection system according to one embodiment of the present invention is shown in FIG. 2. A cell controller 40 of a cell site 38 is connected to a cellular switching system 42 through voice and control lines 44. The cellular switching system 42, also referred to as a mobile telecommunications switching office (MTSO), is located at the cell site 38 but is typically connected to multiple other cell sites. The cellular switching system 42 is in turn connected to a public switch network (not shown). A modulator 46 connected to the cell controller 40 receives control messages and modulates them onto a carrier frequency in the 800 MegaHertz (MHz) range which represents the frequency of a forward control channel. It is to be understood, however, that the present invention is not limited by the particular carrier frequency which may be different depending on the wireless telephone system being used. A control channel (CCH) editor 62, which will be described in greater detail below, is connected to the modulator 46 through a control channel (CCH) transmitter 48. The CCH editor 62 transmits the modulated RF signal on the forward control channel using a transmitting antenna 50. A selected cellular telephone 52 receives the transmitted RF signal through an antenna 54 and in response to the received control message, transmits on a reverse control channel an RF signal containing a response message and a reference waveform. A control channel (CCH) receiver 56 receives the RF signal from the cellular telephone 52 through a receiving antenna 58. A demodulator 60 connected to the CCH receiver 56 demodulates the RF signal into a baseband waveform. The cell controller 40 is connected to the demodulator 60 and receives the baseband waveform. The cell controller 40 retrieves the response message from the baseband waveform and performs an appropriate action according to the response message contained in the RF signal transmitted by the cellular telephone 52. The cell site 38 typically includes other modules such as voice channel (VCH) transmitters and receivers, which are omitted from FIG. 2 for clarity.

An active reference waveform collection system 64 is connected to the CCH editor 62. The waveform collection system 64 includes a processor 66 connected to a memory 68. The waveform collection routine 10 of FIG. 1 is stored in the memory 68 and is executed by the processor 66. As will be appreciated by persons of ordinary skill in the art, the reference waveform collection routine 10 of FIG. 1 may be executed by an already existing processor (not shown) in the cell controller 40 or in the cellular switching system 42 depending on whether the processor has sufficient processing power to handle both the call processing and waveform collection. Similarly, the waveform collection routine 10 of FIG. 1 may be stored in the memory (not shown) of the cell controller 40 or the cellular switching system 42. According to the invention, the processor 66 formats a polling message and sends it to the CCH editor 62 over a control and data bus 70. The CCH editor 62 inserts the polling message received on the control and data bus 70 into the RF signal received from the CCH transmitter 48. The CCH editor 62 is described in more detail in the Rudokas patent. The modified RF signal containing the polling message is then transmitted through the transmitting antenna 50. The selected cellular telephone 52 receives the polling message and transmits an RF signal containing a response message and a reference waveform.

The RF signal from the cellular telephone 52 is received by not only the CCH receiver 56 but also by a control channel (CCH) receiver 72 of the waveform collection system 64 through the receiving antenna 58. While the CCH receiver 72 of the waveform collection system 64 is separate from the CCH receiver 56 for timing and performance reasons, the existing CCH receiver 56 in the cell site 38 may be used instead. A demodulator 74 demodulates the RF signal received by the CCH receiver 72 into a baseband waveform. An analog to digital (A/D) converter 76 converts the baseband waveform into a digital waveform. The processor 66 extracts the reference waveform contained in the digital waveform, which is used to build a fingerprint of the transmitter of the cellular telephone 52. As discussed above, the reference waveform may be the turn-on transient, represented by the leading portion of the digital waveform, or the turn-off transient, represented by the trailing portion of the digital waveform, of the cellular telephone's transmitter. The processor then stores the reference waveform into the memory 68. While it is preferable to obtain the reference waveform from the demodulated baseband waveform, it may be obtained from the unmodulated RF waveform. This is done by connecting the A/D converter 76 to the CCH receiver 72 in order to convert the original RF waveform into a digital waveform provided that the sampling rate of the A/D converter 76 can be increased to the GigaHertz (GHz) range.

From FIG. 2, persons of ordinary skill in the art will appreciate that the present invention, including the reference waveform collection system 64 and CCH editor 62, is designed to be used with an existing cell site to provide a cost effective method of collecting reference waveforms.

Figure 3:
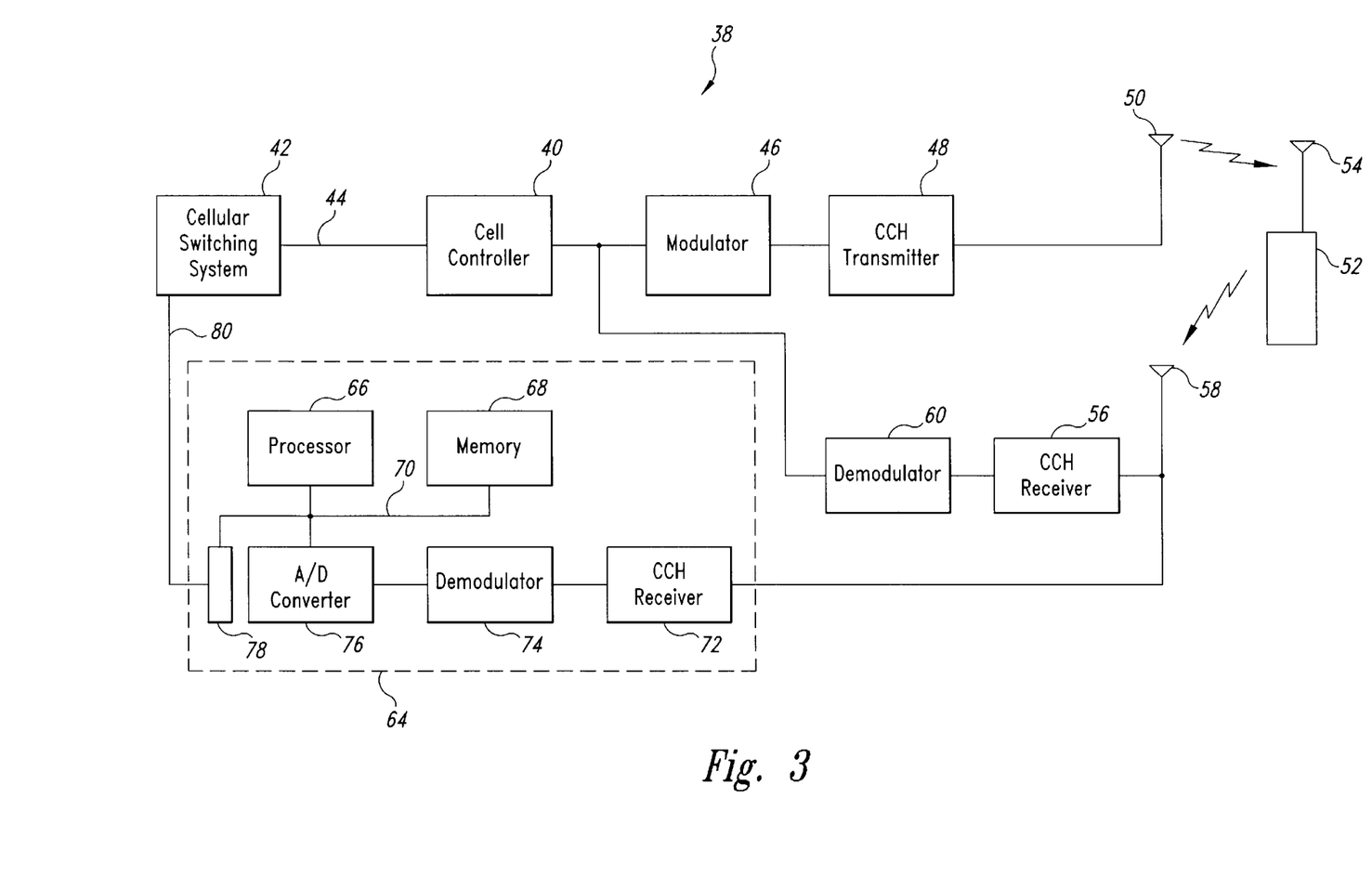
FIG. 3 is a first alternative embodiment of the transmitter reference waveform collection system of the present invention.

A functional block diagram of a first alternative waveform collection system according to the present invention is shown in FIG. 3. FIG. 3 illustrates a less intrusive way of adding the waveform collection system 64 into the cell site 38. Rather than using the CCH editor 62 of FIG. 2, in this embodiment the existing cellular switching system 42 is used to poll the selected cellular telephone 52. Specifically, the system 64 initiates a telephone call to the selected cellular telephone 52 to elicit a transmission response containing a reference waveform. Once the system 64 obtains the reference waveform, the system releases the call in progress before the selected telephone 52 rings so that the user of the selected cellular telephone 52 is unaware of the collection process.

The waveform collection system 64 includes a line interface circuit 78 that is connected to the control and data bus 70. A trunk line 80 connects the line interface circuit 78 to the cellular switching system 42. According to the invention, the processor 66 polls the selected cellular telephone 52 by dialing its telephone number through the interface circuit 78. The interface circuit 78 sends the dialed digits to the cellular switching system 42 through the trunk line 80. The trunk line 80 may be a plain old telephone service (POTS) line, integrated services digital network (ISDN) line, T1 line, subscriber loop carrier (SLC) line, or any other line that may be interfaced to the cellular switching system 42. Alternatively, a plain telephone or cellular telephone may be connected to the line interface circuit 78 rather than the trunk line 80 in order to dial the telephone number of the selected cellular telephone 52. The cellular switching system 42 sends the received dialed digits to the cell controller 40 over the voice and control lines 44. In response, the cell controller 40 sends a polling message, a page message in this case, to the selected cellular telephone 52 over the forward control channel. The cellular telephone 52 receives the polling message and transmits an RF signal containing a response message responsive to the polling message over the reverse control channel. The RF signal from the cellular telephone 52 is received by the CCH receiver 72 of the waveform collection system 64 through the receiving antenna 58. The demodulator 74 demodulates the RF signal received by the CCH receiver 72 into a baseband waveform. The A/D converter 76 converts the baseband waveform into a digital waveform. From the digital waveform, the processor 66 extracts a reference waveform to be used in building a fingerprint of the cellular telephone's transmitter. As discussed above, the reference waveform may be the turn-on transient, represented by the leading portion of the digital waveform, or the turn-off transient, represented by the trailing portion of the digital waveform, of the cellular telephone's transmitter.

When the processor 66 obtains the reference waveform from the received RF signal, it orders the interface circuit 78 to disconnect the call in progress initiated by the line interface circuit. In response, the interface circuit 78 releases the trunk line 80. The cellular switching system 42 then informs the cell controller 40 that the call has been released. Preferably, the call is released before the cell controller 40 has had a chance to assign a voice channel for the selected cellular telephone 52. Releasing the call before the voice channel assignment prevents ringing of the selected cellular telephone 52 so that the user does not know that the telephone was polled in order to collect a reference waveform. As such, multiple reference waveforms may be collected from time to time without ever bothering the user of the selected cellular telephone being polled.

Figure 4:
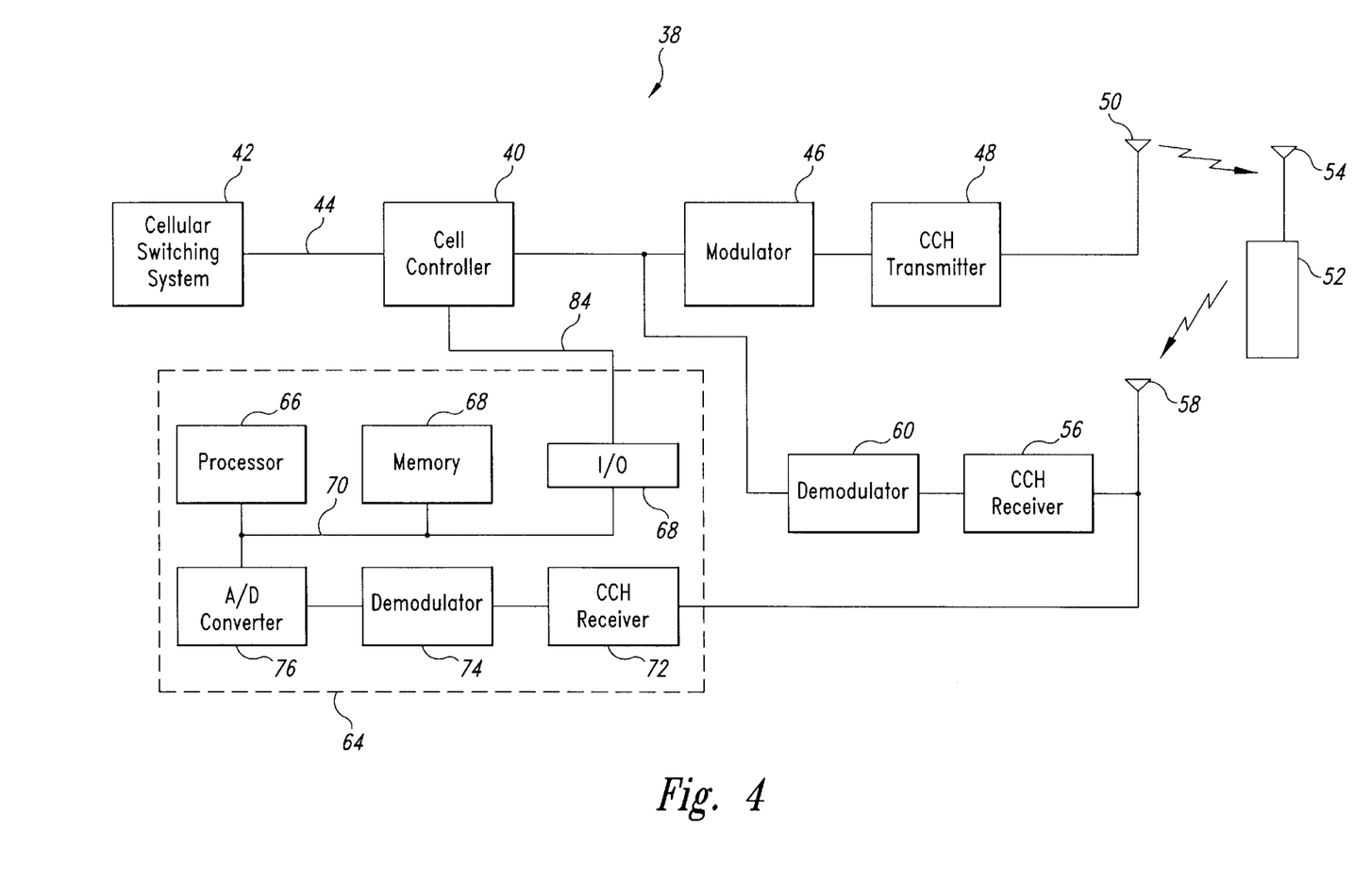
FIG. 4 is a second alternative embodiment of the transmitter reference waveform collection system of the present invention.

A functional block diagram of a second alternative reference waveform collection system according to the present invention is shown in FIG. 4. FIG. 4 illustrates another way of adding the waveform collection system 64 to the cell site 38. Rather than using the CCH editor 62 of FIG. 2, in this embodiment the existing cell controller 40 is used to poll the cellular telephone 52. An I/O interface circuit 82 is included in the waveform collection system 64 and connected to the control and data bus 70. An I/O line 84, such as a tty line, connects the I/O interface circuit 82 to a control terminal port (not shown) of the cell controller 40. The manner in which the cellular telephone 52 is polled through the I/O line 84 depends on the particular make of the cell controller 40. In some cell controllers, the processor 66 polls the cellular telephone 52 by directly inputting I/O polling commands to the control terminal port of the cell controller 40. In other controllers, the cellular telephone 52 may be polled by running a utility program stored in the cell controller 40. Alternatively, the I/O line 84 may be connected to a control terminal port (not shown) of the cellular switching system 42 to poll the selected cellular telephone 52. Again, the manner in which the cellular telephone 52 is polled through the cellular switching system 42 depends on the particular make of the switching system.

According to the present invention, a system and method for collecting reference waveforms from a transmitter of a mobile phone has been described. The present invention provides the advantage of rapidly collecting reference waveforms from a large number of transmitters by actively polling the transmitters without waiting for the transmitters to turn on as was previously necessary. Moreover, the reference waveform collection process occurs in the background and the users of the cellular phones are totally unaware of the process. In a preferred embodiment, the reference waveform collection system is designed to be used with an existing cell site to provide a cost effective method of collecting reference waveforms.

Figure 5:
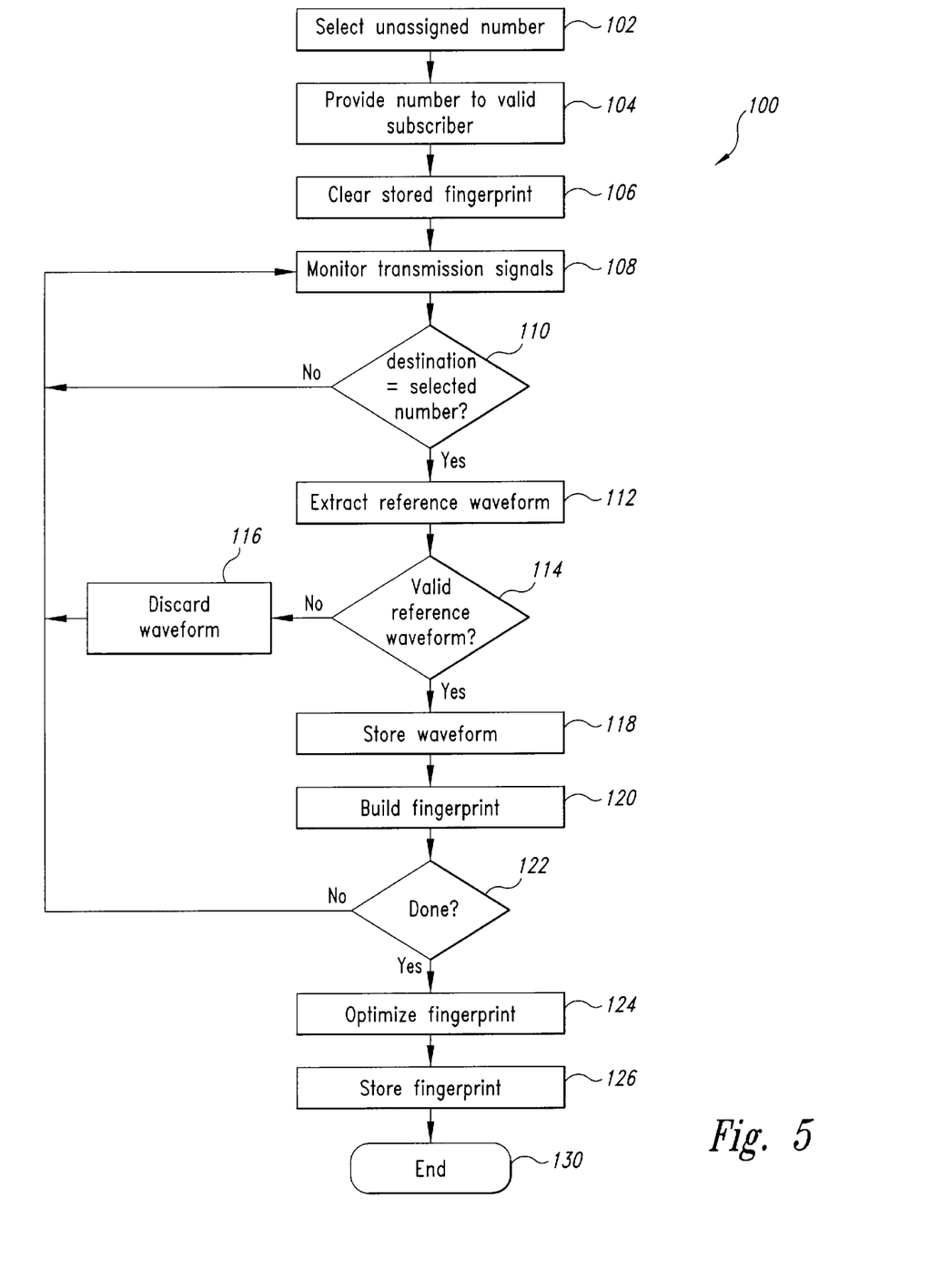
FIG. 5 is a flowchart of an alternative method of collecting transmitter reference waveforms according to the present invention.

As discussed above, there are times when the stored fingerprint of the authorized cellular telephone 52 may not reflect the true transmission characteristics of that cellular telephone. One possible reason may be a sophisticated pirate has discovered how the fingerprint authentication system collects the reference waveforms and corrupted the stored fingerprint with a fingerprint of his own unauthorized cellular telephone. To establish or reestablish a fingerprint of the authorized telephone 52, an alternative reference waveform collection routine 100 shown in FIG. 5 is used to ensure that the reference waveforms being collected are transmitted from the authorized cellular telephone rather than from the pirate's unauthorized cellular telephone.

A cellular service provider maintains a pool of telephone numbers which have not been assigned to any user and which have been specially selected for the purpose of collecting reference waveforms. In step 102, the routine 100 randomly selects one unassigned number from the pool of unassigned numbers as a destination telephone number and temporarily associates the selected number with the authorized cellular telephone 52.

Alternatively, the destination telephone number can be generated by a pseudo-random number-generating algorithm. For example, identification data, such as the ESN or MIN of the authorized telephone 52, may be used as a seed for any of a number of well-known pseudo-random number-generating algorithms. The pseudo-random number may be truncated to a predetermined number of digits to correspond to a destination telephone number. In this embodiment, it is possible that the destination telephone number may correspond to an actual telephone number assigned to another valid subscriber. However, the routine 100 can be designed to collect reference waveforms and terminate the call before the cell site controller actually processes the telephone call. In this manner, the other valid subscriber will not be disturbed by unwanted calls. In addition, the routine 100 can check the pseudo-random destination telephone number to assure that certain destination telephone numbers, such as emergency telephone numbers, are not supplied to the subscriber.

In step 104, the selected destination number is provided to a valid subscriber of the authorized cellular telephone 52 whose fingerprint needs to be established. The valid subscriber is then told to call the destination telephone number for the purpose of collecting reference waveforms of the authorized cellular telephone 52. In step 106, the routine 100 clears the stored fingerprint if it already exists since the previously stored fingerprint may no longer reflect the transmission characteristics of the authorized cellular telephone 52.

In step 108, the routine 100 monitors radio frequency transmission signals from a plurality of cellular telephones in the process of establishing a call. As is well known in the art, each of these transmission signals contains an origination message comprised of the MIN/ESN uniquely identifying the authorized cellular telephone 52 and a destination telephone number (called address). For each transmission signal, in decision 110 it is determined whether the MIN/ESN and the destination telephone number contained in the transmission signal match the authorized telephone's MIN/ESN and the associated randomly selected destination telephone number that was provided to the valid subscriber in step 104. If the decision is NO, control passes to step 108 where the routine 100 continues to continuously monitor the transmission signals. If, however, the decision 110 is YES, it signifies that the transmission signal containing the randomly selected destination number was transmitted by the authorized telephone of the valid subscriber since the pirate has no way of knowing the randomly selected destination number provided to the valid subscriber. In step 112, the routine 100 extracts from the transmission signal a reference waveform that is indicative of a transmission characteristic of the authorized cellular telephone 52 from which a fingerprint can be derived. As discussed above, the reference waveform may be the turn-on transient, represented by the leading portion of the RF signal, the turn-off transient, represented by the trailing portion of the RF signal, or any other portion of the transmission signal that represents a transmission characteristic of the authorized cellular telephone 52. Such reference waveforms are described in greater detail in the Ferrell patent.

In decision 114, the routine 100 checks the quality of the extracted reference waveform. As can be appreciated, the quality of the extracted reference waveform is affected by many factors such as the location of the authorized cellular telephone 52, strength of the battery in the telephone, multi-path interference, or other sources of radio frequency interference. If the reference waveform deviates from an expected reference waveform, step 116 is executed in which the extracted reference waveform is discarded. Subsequently, control passes to step 108 where the routine 100 continues to continuously monitor the transmission signals. However, if the reference waveform is determined to be valid, step 118 is executed and the reference waveform is stored in memory.

As the reference waveforms are collected, or subsequently, step 120 builds a fingerprint of the authorized cellular telephone 52. In one embodiment, certain transmission characteristics including turn-on transmitting amplitude, phase modulation versus time, and deviation from a center frequency may be derived from the received reference waveform. The process of obtaining such a fingerprint is described in more detail in the Ferrell patent. In decision 122, it is determined whether a sufficient number of valid reference waveforms have been collected. In one embodiment, at least 10 waveforms and preferably 20–40 waveforms is considered sufficient. If decision 122 is NO, control passes to step 108 and the routine 100 again continuously monitors the transmission signals. If decision 122 is YES, step 124 is executed.

In step 124, the fingerprint built from step 120 is optimized. This step may be performed in real-time or at a later time when fingerprints for a group of cellular telephones may be processed. In step 124, a more rigorous analysis and processing of the stored reference waveforms are performed in order to obtain an optimized fingerprint. The optimization step may include rejection of some of the received reference waveforms based on statistical analysis, and improved normalization and alignment of the waveforms. In step 126, the optimized fingerprint is stored in a database. Preferably, digital data representing the received reference waveforms are also stored in the database for future use including further optimization of the fingerprint and obtaining a different type of fingerprint. Once the optimized fingerprint is stored, the routine 100 ends at step 130.

As can be appreciated by persons of ordinary skill in the art, the routine 100 provides maximum protection against obtaining erroneous reference waveforms from a pirate's unauthorized cellular telephone by verifying each call made by the valid subscriber's authorized cellular telephone 52. This also means, however, that the routine 100 requires the valid subscriber to call the randomly selected destination number at least 10 times in order to collect 10 reference waveforms that are necessary in the preferred embodiment to build an accurate fingerprint.

As currently envisioned, the reference waveform collection routine 100 is designed to be used when the fingerprint of the valid subscriber's cellular telephone is corrupted and as a result, the subscriber experiences blocked calls. As can be appreciated, the subscriber is probably upset about the blocked calls and the cellular service provider may be unwilling to further inconvenience the subscriber by requiring him to call the randomly selected number at least 10 times.

Accordingly, the present invention provides an alternative embodiment that requires the valid subscriber to call the randomly selected destination number only once regardless of the number of reference waveforms that need to be collected. In this embodiment, the more active reference waveform collection routine 10 of FIG. 1 is used once the initial call from the valid subscriber is verified through steps 102–110 of the routine 100 of FIG. 5 as being transmitted by the authorized cellular telephone 52. After the initial verification of steps 102–110, and after the reference waveform extracted from the initial call is either stored or discarded in steps 112–118, the authorized cellular telephone 52 is repeatedly polled in order to rapidly collect a sufficient number of reference waveforms necessary to generate an accurate fingerprint using steps 14–22 and 28 of FIG. 1. When a sufficient number of reference waveforms are collected, the optimization and storage steps 124 and 126 are performed.

Figure 6:
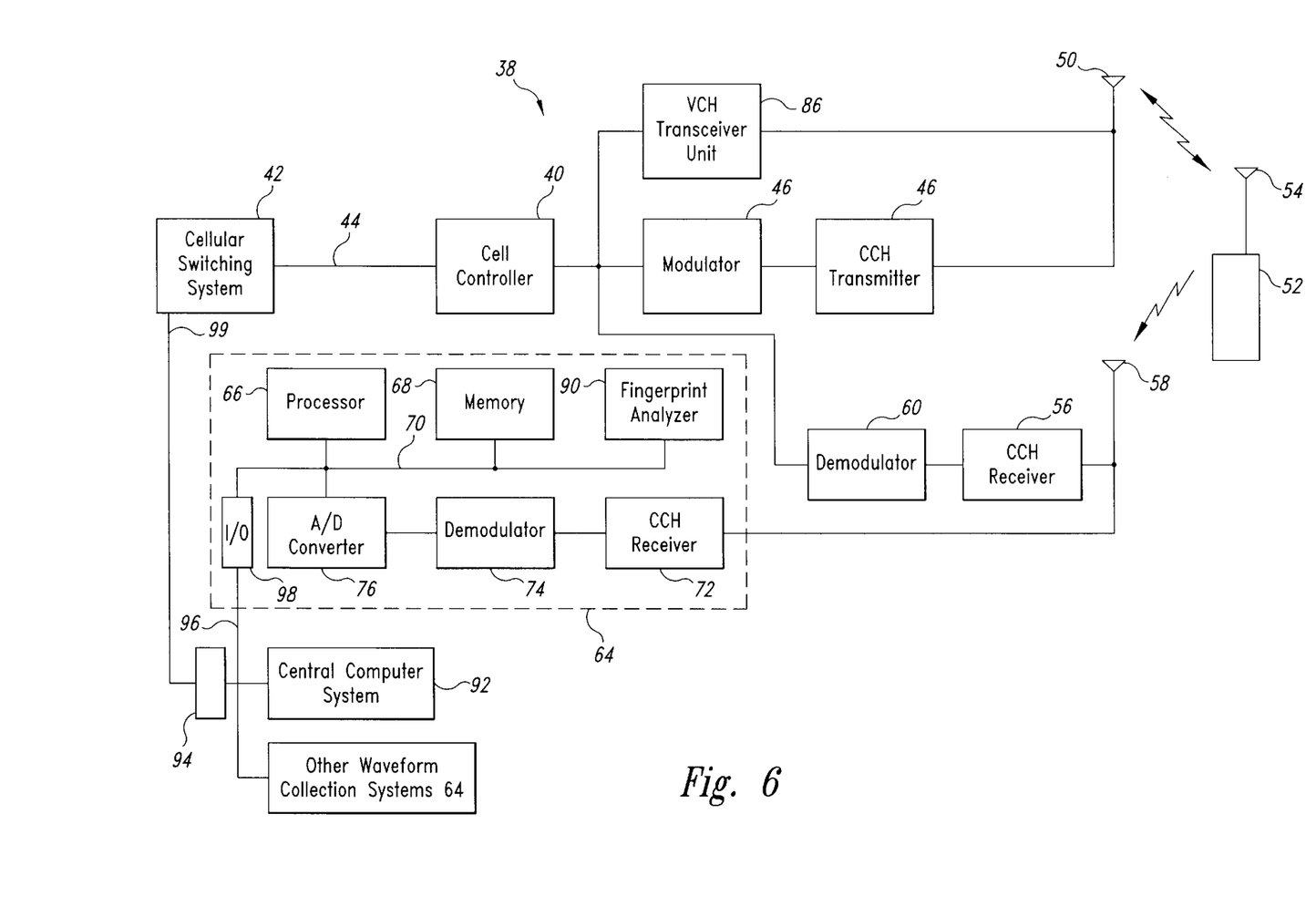
FIG. 6 is a functional block diagram of a transmitter reference waveform collection system implementing the method of FIG. 5.

FIG. 6 shows a functional block diagram of a reference waveform collection system implementing the reference waveform collection routine 100 of FIG. 5. The system of FIG. 6 incorporates the basic system of FIG. 4 previously described. In this embodiment, the reference waveform collection system 64 of each of a plurality of cell sites 38 is connected to a central computer system 92 through a high-speed data link 96 to control a group of cell sites.

The cellular telephone 52 may initiate a call by transmitting on a reverse control channel a call request RF transmission signal. The call request signal contains a destination such as a telephone number and an identification of its cellular telephone such as the MIN/ESN. The control channel (CCH) receiver 56 receives the RF transmission signal from the cellular telephone 52 through the receiving antenna 58. The demodulator 60 connected to the CCH receiver 56 demodulates the RF signal into a baseband waveform. The cell controller 40 receives the baseband waveform and retrieves a call request message contained in the baseband waveform and establishes a voice connection to the cellular telephone 52 through a voice channel (VCH) transceiver unit 86 which is connected to the cell controller 40 and the antenna 50. The cellular switching system 42 connects the call to its destination through the public switch network (not shown).

As in FIG. 4, the reference waveform collection system 64 of FIG. 6 includes the processor 66 connected to the memory 68 through the control and data bus 70. The reference waveform collection routine 100 of FIG. 5 is stored in the memory 68 and is executed by the processor 66. As will be appreciated by persons of ordinary skill in the art, the waveform collection routine 100 of FIG. 5 may be executed by an already existing processor (not shown) in the cell controller 40 or in the cellular switching system 42 depending on whether the existing processor has sufficient processing power to handle both the call processing and waveform collection. The waveform collection routine 100 of FIG. 5 may also be executed by the central computer system 92 which is connected to the processor 66 through an input/output (I/O) interface circuit 98 connected between the high speed data link 96 and the control and data bus 70. Similarly, the waveform collection routine 100 of FIG. 5 may be stored in the memory (not shown) of the cell controller 40, the cellular switching system 42 or the central computer system 92. Preferably, the processor 66 in the system 64 and the central computer system 92 are load shared such that processing of certain tasks may take place in either system depending on which system is busier at the time.

In operation, the processor 66 extracts the reference waveform contained in the digital waveform, which is used to build a fingerprint of the transmitter of the cellular telephone 52. As discussed above, the reference waveform may be the turn-on transient, represented by the leading portion of the digital waveform, or the turn-off transient, represented by the trailing portion of the digital waveform, of the cellular telephone's transmitter. The processor then stores the reference waveform into the memory 68 through the control and data bus 70. While it is preferable to obtain the reference waveform from the demodulated baseband waveform, it may be obtained from the unmodulated RF waveform. This is done by connecting the A/D converter 76 to the CCH receiver 72 in order to convert the original RF waveform into a digital waveform provided that the sampling rate of the A/D converter 76 can be increased to the GigaHertz (GHz) range.

The system 64 of FIG. 6 includes a fingerprint analyzer 90 connected to the control and data bus 70 which performs a fingerprint analysis of a transmission characteristic of the transmitter in the cellular telephone 52. The fingerprint analyzer 90 may be a digital signal processor (DSP), a part of the processor 66, a separate processor, or the like. As discussed above, any acceptable fingerprint analysis technique will operate satisfactorily with the system 64.

An announcement module 94 is connected to the waveform collection system 64 and the central computer system 92 through the high speed data link 96. The announcement module 94 is also connected to the cellular switching system 42 through a line 99. The line 99 may be a plain old telephone service (POTS) line, integrated services digital network (ISDN) line, T1 line, subscriber loop carrier (SLC)

line, or any other line that may be interfaced to the cellular switching system 42.

As described above, the central computer system 92 maintains a plurality of unassigned telephone numbers. These numbers are programmed in the cellular switching system 42 to be routed to the line 99. Thus, when the valid subscriber calls the randomly assigned destination number using the authorized cellular telephone 52, the cellular switching system 42 receives the destination number through the voice and control lines 44 and routes the call to the line 99 through the VCH transceiver unit 86 and the cell controller 40. In a preferred embodiment, during execution of decision 122 of the routine 100 of FIG. 5, the central computer system 92 connects the announcement module 94 to the line 99 to play a voice message requesting the valid subscriber to call again if more reference waveforms are needed. Otherwise, the announcement module plays a message telling the valid subscriber that the reference waveform collection process is complete and no more calls are necessary. The voice messages from the announcement module 94 are transmitted to the authorized cellular telephone 52 through the VCH transceiver unit 86.

From the foregoing it will be appreciated that, although specific embodiments of the invention have been described herein for purposes of illustration, various modifications may be made without deviating from the spirit and scope of the invention. Accordingly, the present invention is not limited except as by the appended claims.

What is claimed is:

1. A method of collecting a reference waveform from an authorized wireless telephone in a wireless telephone system including a fingerprint analyzer that identifies an unauthenticated wireless telephone as authorized or fraudulent based on a fingerprint analysis by comparing a transmission characteristic of the unauthenticated wireless telephone with a stored fingerprint of a corresponding authorized wireless telephone, the method comprising the steps of:

(a) selecting a first destination to be called by the authorized wireless telephone;

(b) associating the selected destination to be called by the authorized wireless telephone with a first identification of the authorized wireless telephone;

(c) receiving from a wireless telephone a transmission signal containing a transmitted destination and a transmitted identification of the wireless telephone transmitting the transmission signal;

(d) determining whether the transmitted destination and the transmitted identification of the transmitting wireless telephone respectively correspond to the selected first destination and the associated first identification of the authorized wireless telephone; and (e) if the transmitted destination and the transmitted identification of the transmitting wireless telephone are determined to respectively correspond to the selected first destination and the associated first identification of the authorized wireless telephone, performing the following steps:

extracting from the transmission signal a reference waveform indicative of a transmission characteristic of the transmitting wireless telephone; and
   storing the extracted reference waveform as a reference waveform of the authorized wireless telephone for subsequent use by the fingerprint analyzer.

2. The method according to claim 1, further comprising repeating steps (c) to (e) until a predetermined number of extracted reference waveforms are stored as reference waveforms of the authorized wireless telephone.

3. The method according to claim 1 wherein step (e) further comprises the step or connecting the authorized wireless telephone to an announcement module.

4. The method according to claim 3, further comprising the step of causing the announcement module to play a voice message indicating that a user of the transmitting wireless telephone is to call the selected first destination again whereby an additional reference waveform is collected.

5. The method according to claim 1, prior to step (c), further comprising the step of removing a previously stored fingerprint of the authorized wireless telephone.

6. The method according to claim 1, further comprising the step of building a fingerprint using the stored extracted reference waveform.

7. The method according to claim 1 wherein in step (a) the first destination to be called by the authorized wireless telephone is randomly selected from a plurality of predetermined unassigned destinations.

8. The method according to claim 1 wherein in step (a) the first destination to be called by the authorized wireless telephone is a pseudo-random destination telephone number.

9. The method according to claim 1 wherein step (e) further comprises repeating the following steps n times where n is greater than one:

polling the transmitting wireless telephone to automatically stimulate a transmission response signal containing a reference waveform indicative of a transmission characteristic of the transmitting wireless telephone;
   receiving from the transmitting wireless telephone the transmission response signal responsive to the poll;
   extracting the reference waveform from the received transmission response signal; and
   storing the extracted reference waveform from the received transmission response signal for subsequent use by the fingerprint analyzer.

10. The method according to claim 9 wherein the step of polling comprises transmitting to the transmitting wireless telephone one of a page, registration, audit and maintenance message to stimulate the transmission response signal.

11. The method according to claim 9 wherein the step of polling comprises transmitting a page message to the transmitting wireless telephone, and further including, after the step of polling, the step of transmitting a hang-up message to the transmitting wireless telephone to prevent the transmitting wireless telephone from ringing.

12. A method of collecting a reference waveform from an authorized wireless telephone to be subsequently used by a fingerprint analyzer to distinguish telephone calls made by the authorized wireless telephone from telephone calls made by an unauthorized wireless telephone, the method comprising the steps of:

(a) selecting a destination to be called by the authorized wireless telephone;

(b) associating the selected destination to be called by the authorized wireless telephone with an identification of the authorized wireless telephone;

(c) monitoring transmission signals from a plurality of wireless telephones, each transmission signal containing a destination and an identification of the wireless telephone transmitting the transmission signal;

(d) identifying a transmission signal among the monitored transmission signals whose destination and identification contained therein respectively correspond to the selected destination and the associated identification of the authorized wireless telephone;

(e) obtaining a reference waveform from the wireless telephone transmitting the identified transmission signal; and (f) storing the obtained reference waveform as a reference waveform of the authorized wireless telephone for subsequent use by the fingerprint analyzer.

13. The method according to claim 12 wherein step (e) comprises extracting from the identified transmission signal a reference waveform indicative of a transmission characteristic of the wireless telephone transmitting the identified transmission signal.

14. The method according to claim 12, further comprising repeating steps (e) to (f) until a predetermined number of reference waveforms are stored as reference waveforms of the authorized wireless telephone.

15. The method according to claim 12 wherein in step (a) the destination to be called by the authorized wireless telephone is randomly selected from a plurality of unassigned destinations.

16. The method according to claim 12 wherein in step (a) the destination to be called by the authorized wireless telephone is a pseudo-random destination telephone number.

17. The method according to claim 12 wherein steps (e) to (f) comprise repeating the following steps n times where n is greater than one:
   polling the wireless telephone transmitting the identified transmission signal to automatically stimulate a transmission response signal containing a reference waveform indicative of a transmission characteristic of the wireless telephone transmitting the identified transmission signal;
   receiving from the wireless telephone transmitting the identified transmission signal the transmission response signal responsive to the poll;
   extracting the reference waveform from the received transmission response signal; and
   storing the extracted reference waveform as a reference waveform of the authorized wireless telephone for subsequent use by the fingerprint analyzer.

18. A method of collecting a reference waveform from an authorized wireless telephone to be subsequently used by a fingerprint analyzer to distinguish telephone calls made by the authorized wireless telephone from telephone calls made by an unauthorized wireless telephone, the method comprising the steps of:
   (a) selecting a destination to be called by a valid user using the authorized wireless telephone;
   (b) associating the selected destination with an identification of the authorized wireless telephone;
   (c) providing the selected destination to the valid user of the authorized wireless telephone;
   (d) monitoring transmission signals from a plurality of wireless telephones, each transmission signal containing a destination and an identification of a wireless telephone;
   (e) identifying among the monitored transmission signals a transmission signal whose destination and identification contained therein respectively correspond to the selected destination and the associated identification of the authorized wireless telephone;
   (f) obtaining, from the wireless telephone transmitting the identified transmission signal, a reference waveform indicative of a transmission characteristic of the wireless telephone transmitting the identified transmission signal; and
   (g) storing the obtained reference waveform as a reference waveform of the authorized wireless telephone for subsequent use by the fingerprint analyzer.

19. The method according to claim 17 wherein step (f) comprises extracting from the identified transmission signal a reference waveform indicative of a transmission characteristic of the wireless telephone transmitting the identified transmission signal.

20. The method according to claim 17, further comprising repeating steps (f) to (g) until a predetermined number of obtained reference waveforms are stored as reference waveforms of the authorized wireless telephone.

21. The method according to claim 17, after step (e), further comprising the step of connecting the wireless telephone transmitting the identified transmission signal to an announcement module.

22. The method according to claim 21, further comprising the step of causing the announcement module to play a voice message indicating that the valid user of the authorized wireless telephone is to call the selected destination again whereby an additional reference waveform is obtained.

23. The method according to claim 18, prior to step (d), further comprising the step of removing a previously stored fingerprint of the authorized wireless telephone.

24. The method according to claim 18, further comprising the step of building a fingerprint using the stored reference waveform.

25. The method according to claim 18 wherein in step (a) the destination to be called by the authorized wireless telephone is randomly selected from a plurality of unassigned destinations.

26. The method according to claim 18 wherein in step (a) the destination to be called by the authorized wireless telephone is a pseudo-random destination telephone number.

27. The method according to claim 18 wherein step (f) comprises:
   polling the wireless telephone transmitting the identified transmission signal to automatically stimulate a transmission response signal containing a reference waveform indicative of a transmission characteristic of the wireless telephone transmitting the identified transmission signal;
   receiving from the wireless telephone transmitting the identified transmission signal the transmission response signal responsive to the poll; and
   extracting the reference waveform from the received transmission response signal.

28. The method according to claim 27 wherein the step of polling comprises transmitting to the wireless telephone transmitting the identified transmission signal one of a page, registration, audit and maintenance message.

29. The method according to claim 27 wherein the step of polling comprises transmitting a page message to the wireless telephone transmitting the identified transmission signal, and further including, after the step of polling, the step of transmitting a hang-up message to the wireless telephone transmitting the identified transmission signal to prevent the wireless telephone transmitting the identified transmission signal from ringing.

30. A system for collecting a reference waveform from an authorized wireless telephone to be subsequently used by a fingerprint analyzer to distinguish telephone calls made by the authorized wireless telephone from telephone calls made by an unauthorized wireless telephone, wherein a user of the authorized wireless telephone is provided with a destination to be called using the authorized wireless telephone, the system comprising:
   a radio frequency (RF) receiver operable to receive transmission signals from a plurality of wireless telephones, each transmission signal containing a destination and an identification of a wireless telephone;

a processor connected to the RF receiver, the processor operable to monitor transmission signals received by the RF receiver and select a transmission signal among the monitored transmission signals whose destination and identification contained therein respectively correspond to the provided destination and the identification of the authorized wireless telephone, and obtain a reference waveform from the wireless telephone transmitting the selected transmission signal, the obtained reference waveform being indicative of a transmission characteristic of the wireless telephone transmitting the selected transmission signal; and a memory connected to the processor and operable to store the obtained reference waveform as a reference waveform of the authorized wireless telephone for subsequent use by the fingerprint analyzer.

31. The system according to claim 30 wherein the processor randomly selects the provided destination among a plurality of unassigned destinations.

32. The system according to claim 30 wherein the processor pseudo-randomly generates the destination.

33. The system according to claim 32 wherein the processor uses the identification of the authorized wireless telephone to generate the pseudo-random destination.

34. The system according to claim 30, further comprising an announcement module connected to the processor and operable to play a voice message.

35. The system according to claim 34 wherein the voice message indicates that the user of the wireless telephone transmitting the selected transmission signal is to call the provided destination again whereby an additional reference waveform is collected.

36. The system according to claim 34, further comprising a switching system connected to the announcement module and programmed to route the call from the wireless telephone transmitting the selected transmission signal to the announcement module.

37. The system according to claim 36, further comprising:
  a voice channel transceiver operable to transmit the voice message to the wireless telephone transmitting the selected transmission signal; and
  a cell controller connected to the voice channel transceiver and the switching system, and operable to connect the voice channel transceiver to the switching system.

38. The system according to claim 37 wherein the authorized wireless telephone is a cellular telephone and the RF receiver is a control channel receiver.

39. A system for collecting a reference waveform from an authorized wireless telephone to be subsequently used to distinguish telephone calls made by the authorized wireless telephone from telephone calls made by an unauthorized wireless telephone, wherein a user of the authorized wireless telephone is provided with a destination to be called using the authorized wireless telephone, the system comprising:
  a radio frequency (RF) receiver operable to receive transmission signals from a plurality of wireless telephones, each transmission signal containing a destination and an identification of a wireless telephone;

a processor connected to the RF receiver, the processor operable to select a wireless telephone transmitting a transmission signal whose destination and identification contained therein respectively correspond to the provided destination and the identification of the authorized wireless telephone, and obtain a reference waveform from the selected wireless telephone, the obtained reference waveform being indicative of a transmission characteristic of the selected wireless telephone; and a memory connected to the processor and operable to store the obtained reference waveform.

40. The system according to claim 39 wherein the processor randomly selects the provided destination among a plurality of unassigned destinations.

41. The system according to claim 39 wherein the processor pseudo-randomly generates the destination.

42. The system according to claim 39, further comprising an announcement module connected to the processor and operable to play a voice message.

43. The system according to claim 42 wherein the voice message indicates that the user of the selected wireless telephone is to call the destination again whereby an additional reference waveform is collected.

44. The system according to claim 42, further comprising a switching system connected to the announcement module and programmed to route the call from the selected wireless telephone to the announcement module.

45. The system according to claim 44, further comprising:
  a voice channel transceiver operable to transmit the voice message to the selected wireless telephone; and
  a cell controller connected to the voice channel transceiver and the switching system, and operable to connect the voice channel transceiver to the switching system.

46. The system according to claim 39, further comprising a fingerprint analyzer connected to the RF receiver and operable to identify an unauthenticated wireless telephone as authorized or fraudulent based on a fingerprint analysis by comparing a transmission characteristic of the unauthenticated wireless telephone with a stored fingerprint of a corresponding authorized wireless telephone.

47. The system according to claim 39 located at a cell site for use with other similar collection systems located at other cell sites wherein the processor comprises:
  a first processor connected to the RF receiver and located at the cell site;
  a data link; and
  a second processor connected to the first processor through the data link, the second processor being connected to other processors of the other similar collection systems located at the other cell sites through the data link.

48. The system according to claim 47 wherein the second processor is load shared with the first processor located at the cell site and the other processors located at the other cell sites.

* * * * *